United States Patent [19]

Foldes

[11] Patent Number: 4,819,580
[45] Date of Patent: Apr. 11, 1989

[54] DISPOSABLE CAT LITTER BOX

[75] Inventor: David A. Foldes, Reseda, Calif.

[73] Assignee: A KAD Co., Brewster, N.Y.

[21] Appl. No.: 1,872

[22] Filed: Jan. 9, 1987

[51] Int. Cl.[4] .............................................. A01K 45/00
[52] U.S. Cl. ...................................................... 119/1
[58] Field of Search ...................... 119/1, 19; 220/403, 220/404, 405, 406, 407, 408; 206/216

[56] References Cited

U.S. PATENT DOCUMENTS

| | | | |
|---|---|---|---|
| 3,358,647 | 12/1967 | Wilson | 119/1 |
| 3,771,493 | 11/1973 | Chandor | 119/1 |
| 3,978,818 | 9/1976 | Heldenbrand | 119/1 |
| 4,136,798 | 1/1979 | Oberstein | 220/408 |
| 4,156,400 | 5/1979 | Migdal | 119/1 |

FOREIGN PATENT DOCUMENTS

| | | | |
|---|---|---|---|
| 2514990 | 4/1983 | France | 119/19 |
| 2556560 | 6/1985 | France | 119/19 |

*Primary Examiner*—John J. Wilson
*Attorney, Agent, or Firm*—Brumbaugh, Graves, Donohue & Raymond

[57] ABSTRACT

Open-top receptacle is embraced with tube of waterproof polymer film material. The tube extends beyond the receptacle and is sufficiently long and large so that when it is desired to dispose of the litter box, the tube is inverted over the entire litter box to enclose and seal it.

10 Claims, 1 Drawing Sheet

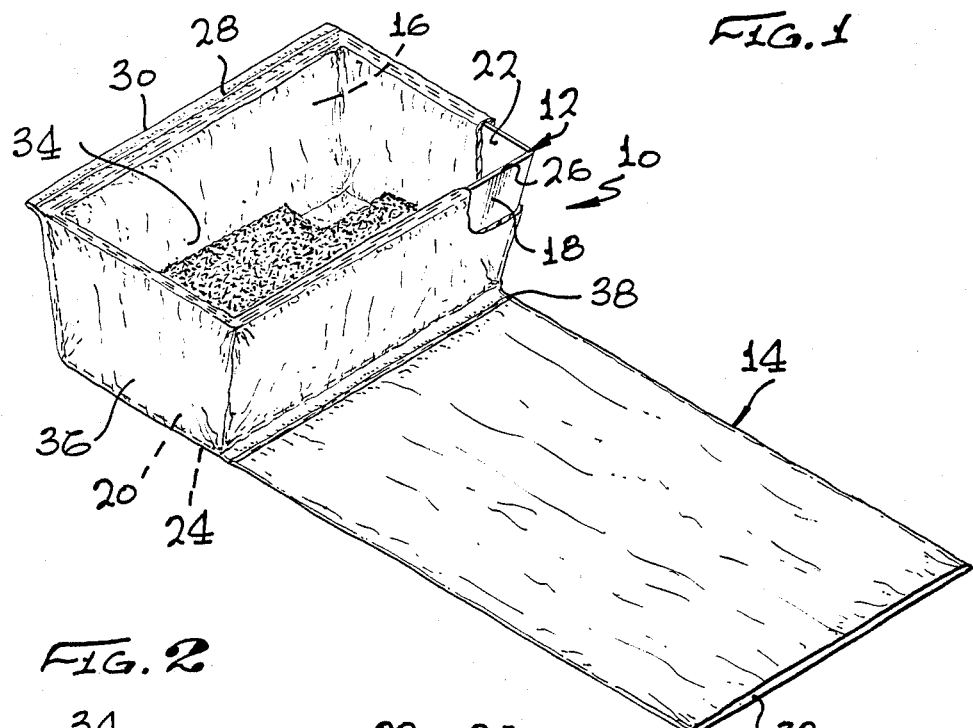
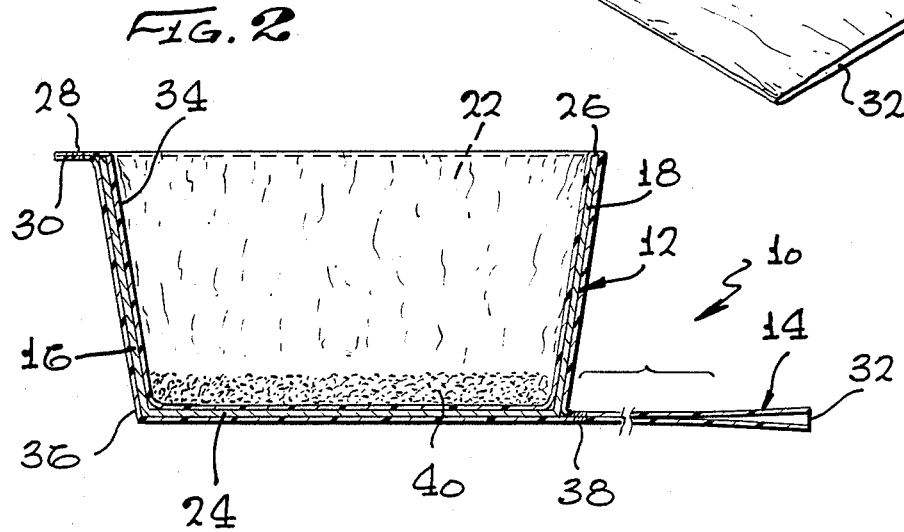
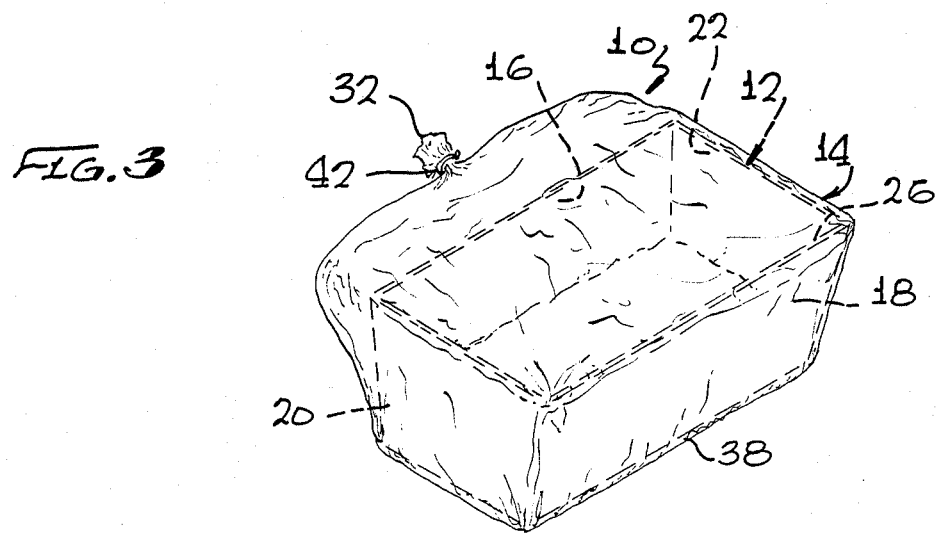

DISPOSABLE CAT LITTER BOX

BACKGROUND OF THE INVENTION

This invention is directed to a disposable cat litter box which includes a receptacle joined together with a waterproof polymer film material sleeve which is attached to the cat litter box receptacle and can be inverted over it to enclose the cat litter box receptacle.

Cat owners often use boxes containing sawdustlike litter as receptacles for the waste products of cats which are kept indoors. These indoor litter boxes must often be emptied of their litter to avoid accumulation of cat waste and to avoid its accompanying odors. The handling of the litter is at very least unpleasant. Furthermore, it is now thought that the handling by humans of such litter may lead to disease. Thus, there is need for a disposable cat litter box which includes features by which the litter can be enclosed for disposal without handling.

SUMMARY OF THE INVENTION

In order to aid in the understanding of this invention, it can be stated in essentially summary form that it is directed to a disposable cat litter box which comprises an open-top receptacle which contains a portion of a tube of waterproof polymer film material so that the bottom and sides of the receptacle are continuously enclosed, with the tube extending beyond the receptacle, with the tube being sufficiently long and wide so that it can be inverted over the receptacle to completely enclose the receptacle and contents thereof.

It is, thus, an object and advantage of this invention to provide a disposable cat litter box which is sufficiently economic of construction that it may be disposed of, together with the used litter therein so as to eliminate the need for emptying and cleaning of the litter box.

It is another object and advantage of this invention to provide a disposable cat litter box which includes an open-top, waterproof receptacle which has a waterproof polymer film tube attached thereto with the tube being of sufficient length and width so that the tube can be inverted over and enclose the receptacle and its contents to provide for sanitary and odor-proof disposable of the used cat litter box.

The features of the present invention which are believed to be novel are set forth with particularity in the appended claims. The present invention, both as to its organization and manner of operation, together with further objects and advantages thereof, may be best understood by reference to the following description, taken in conjunction with the accompanying drawings.

BRIEF DESCRIPTION OF THE DRAWINGS

FIG. 1 is an isometric view of the disposable cat litter box of this invention, ready for installation of litter therein for use.

FIG. 2 is a transverse section therethrough, with parts broken away.

FIG. 3 is a view similar to FIG. 1, but showing the cat litter box after use, with the litter box enclosed in its own tube.

DESCRIPTION OF THE PREFERRED EMBODIMENT

The disposable cat litter box of this invention is generally indicated at 10 in FIGS. 1, 2 and 3. Receptacle 12 is enclosed by tube 14 in each of the figures and, thus, is not directly seen. However, the tube 14 may be of transparent material and, thus, the receptacle may be seen therethrough. For the purpose of this description, the tube is considered to be transparent so that the actual receptacle can be viewed for description. The open-top box configuration of receptacle 12 includes side walls 16 and 18, end walls 20 and 22, and bottom 24. These walls are secured together and to the bottom to provide a receptacle sufficiently strong for handling. The receptacle need not be waterproof because it is covered by waterproof polymer film tube 14. However, the receptacle must have a top edge 26 extending therearound and defining the recess opening down into the receptacle. In view of the fact that the receptacle 12 holds the tube 14 of waterproof polymer film material in place, the receptacle may have such openings therein as are helpful for manufacture or economy. The receptacle may be made of folded cardboard and may be held in the open-top box position by the employment of tabs and slots, staples or adhesive. Furthermore, the receptacle may be out of molded material such as polymer composition material or cellulose fibers deposited out of a fluid stream.

Tube 14 is made of flexible waterproof polymer film material such as polyethylene. The film material is sufficiently thin to be flexible, and the use of the use of the film requires that it be attachable to itself, such as by heat-sealing. Thus, the film is preferably thermoplastic. The film is formed into a tube either by being initially extruded as a tube or it may be formed into a tube by folding and heat-sealing a longitudinal edge. In addition, the tube is cut to a discrete length and is transversely closed to form a bag. The end closure heat-sealing is indicated at 28 in FIGS. 1 and 2 to define the closed end 30 of the tube 14 which now has a baglike configuration. The open end of the tube is indicated at 32.

The width of the tube, laterally thereacross in a direction parallel to the bottom of heat seal 28 is at least equal to the distance from top edge 26, down side wall 18, across bottom 24, and out side wall 16 to the top edge 26. This results in the most narrow tube, but requires a longer tube. It is preferable that the width of the tube be slightly greater than the distance from top edge 26, down end wall 20, across bottom 24 and up end wall 22 to top edge 26. The receptacle is placed within the tube with the closed end 30 adjacent the top edge 26 of one of the side walls, as shown, or adjacent the juncture between one of the side walls and the bottom. The tube is pressed into the open top of the receptacle so as to form an inside layer 34 of the polymer film within the receptacle to enclose and seal the interior recess of the receptacle. The outside layer 36 engages around the outside of the receptacle to enclose it. The tube is sufficiently long so that both layers join at intermediate closure or seal 38 at the diagonally opposite edge of the receptacle from the seal 28. In this way, the entire receptacle is enclosed in the tube to provide the waterproof requirement of the receptacle. The tube extends a substantial distance from seal 38 to the open end 32. This length is of greater length than the distance between seals 28 and 38.

In use, the cat box is employed as shown in FIGS. 1 and 2, with the receptacle open on the top and with cat litter 40 therein. The outer end of the tube between seal 38 and open end 32 can be folded beside side wall 18 and removably taped thereto or may be folded under bottom 24 and removably taped thereto. When the use of the cat box is complete, the free end of the tube outward from seal 38 is stretched out, as shown in FIG. 1, and then is inverted back over the receptacle and the outer portion of the tube encloses the receptacle. The length from seal 38 to open end 32 is sufficiently long that the open end can be gathered together, twisted and secured by tie 42, see FIG. 3. Tie 42 is a wire-containing tie or the like. When the tube is inverted around the receptacle and closed with the tie, both the receptacle and its contents are enclosed and sealed to retain all materials and odor within the closed tube. In this way, a convenient, economic, disposable, sanitary cat litter box is achieved.

This invention has been described in its presently contemplated best mode, and it is clear that it is susceptible to numerous modifications, modes and embodiments within the ability of those skilled in the art and without the exercise of the inventive faculty. Accordingly, the scope of this invention is defined by the scope of the following claims.

What is claimed is:

1. A disposble cat litter box comprising:
   a receptacle having a bottom and having a top edge mounted on said bottom and extending above said bottom, said top edge defining an interior space within said receptacle which is open at the top;
   a flexible waterproof tube, said flexible waterproof tube having a portion which is sufficiently large to receive therein said receptacle and being sufficiently large so that said tube portion can extend below said top edge of said receptacle to form a recess within and below said top edge of said receptacle to receive litter;
   said tube having a closed end thereon and said receptacle being positioned within said tube portion adjacent said closed end of said tube; and
   said tube extending away from said receptacle to an open end, said tube having an intermediate closure between said portion of said tube which contains said receptacle and said open end, said tube being sufficiently long from said intermediate closure to said open end so that said open end of said tube can be inverted over the portion of said tube which contains said receptacle to enclose said receptacle and said recess in said receptacle formed by said tube.

2. The disposable cat litter box of claim 1 wherein said tube is made of thermoplastic waterproof polymer composition film material and said seal at said closed end of said tube is a heat seal and said closure between said open end of said tube and said receptacle is a heat seal.

3. A disposable cat litter box comprising:
   a receptacle, said receptacle having opposite side walls, opposite end walls secured thereto, and a bottom secured to said walls to define an open top box having a top edge so that said receptacle defines a recess between said walls and below said top edge;
   a substantially waterproof synthetic polymer composition material film tube, said film tube having an open end and a closed end, said tube having a width greater than the height of two of said walls plus the length of said bottom therebetween, said receptacle being positioned within said tube adjacent said closed end thereof, with said tube embracing the exterior of said receptacle and being positioned within said recess in said receptacle between and below said top edge of said receptacle, said tube having an intermediate closure between said receptacle and said open end of said tube, the length of said tube between said intermediate closure and said open end of said tube being sufficient so that said tube may be inverted back over the portion of said tube embracing said receptacle to enclose said recess.

4. The disposable cat litter box of claim 3 wherein said intermediate closure of said tube between said receptacle and said open end of said tube is a heat seal closure all the way across said tube so that when said tube is inverted over said receptacle and closed at its free end, said recess is enclosed.

5. The disposable cat litter box of claim 4 wherein said closure at the closed end of said tube is a heat-sealed closure of said tube.

6. The disposable cat litter box of claim 4 wherein the length of said tube between said open end of said tube and said intermediate closure adjacent said receptacle is sufficiently long so that the free end of said tube may be inverted around said receptacle and said free ends can be gathered and tied to completely enclose said receptacle.

7. The disposable cat litter box of claim 3 wherein said receptacle is an open-topped box having continuous side walls directed divergently with respect to each other in the upward direction toward said top edge, said side walls being attached to each other and to said bottom of said receptacle.

8. The disposable cat litter box of claim 7 wherein said intermediate closure of said tube between said receptacle and said open end of said tube is a heat seal closure all the way across said tube so that when said tube is inverted over said receptacle and closed at its free end, said recess is enclosed.

9. The disposable cat litter box of claim 8 wherein said closure at the closed end of said tube is a heat-sealed closure of said tube.

10. The disposable cat litter box of claim 8 wherein the length of said tube between said open end of said tube and said intermediate closure adjacent said receptacle is sufficiently long so that the free end of said tube may be inverted around said receptacle and said free ends can be gathered and tied to completely enclose said receptacle.

* * * * *